(12) United States Patent
Otaviano de Queiroz

(10) Patent No.: US 12,168,969 B2
(45) Date of Patent: Dec. 17, 2024

(54) CURRENT ENERGY COLLECTION UNIT

(71) Applicant: Mauricio Otaviano de Queiroz, Praia Grande (BR)

(72) Inventor: Mauricio Otaviano de Queiroz, Praia Grande (BR)

(*) Notice: Subject to any disclaimer, the term of this patent is extended or adjusted under 35 U.S.C. 154(b) by 0 days.

(21) Appl. No.: 17/995,328

(22) PCT Filed: Mar. 17, 2021

(86) PCT No.: PCT/BR2021/050111
§ 371 (c)(1),
(2) Date: Oct. 3, 2022

(87) PCT Pub. No.: WO2021/203183
PCT Pub. Date: Oct. 14, 2021

(65) Prior Publication Data
US 2024/0026853 A1   Jan. 25, 2024

(30) Foreign Application Priority Data
Apr. 10, 2020  (BR) ................ BR 10 2020 007224.2

(51) Int. Cl.
*F03B 13/26*  (2006.01)
*F03B 3/04*  (2006.01)
*F03B 11/02*  (2006.01)

(52) U.S. Cl.
CPC ............... *F03B 13/26* (2013.01); *F03B 3/04* (2013.01); *F03B 11/02* (2013.01)

(58) Field of Classification Search
CPC ............. F03B 13/26; F03B 3/04; F03B 11/02
See application file for complete search history.

(56) References Cited

U.S. PATENT DOCUMENTS

| | | | |
|---|---|---|---|
| 532,595 A | 1/1895 | Seivert et al. | |
| 5,440,176 A | 8/1995 | Haining | |
| 6,168,373 B1 | 1/2001 | Vauthier | |
| 7,874,788 B2 | 1/2011 | Stothers et al. | |
| 2005/0001432 A1* | 1/2005 | Drentham Susman | F03B 13/264 290/43 |
| 2005/0002783 A1* | 1/2005 | Hiel | F03D 13/10 415/208.1 |
| 2008/0265583 A1 | 10/2008 | Thompson | |

(Continued)

FOREIGN PATENT DOCUMENTS

| | | |
|---|---|---|
| KR | 2013-0126883 A | 11/2013 |
| WO | WO-2009/126995 A1 | 10/2009 |

OTHER PUBLICATIONS

International Search Report and Written Opinion for International Application No. PCT/BR2021/050111, dated Jun. 16, 2021, (17 pages), Instituto Nacional Da Propriedade Industrial, Rio de Janeiro, Brazil.

(Continued)

*Primary Examiner* — Joseph Ortega
(74) *Attorney, Agent, or Firm* — Foley & Lardner LLP

(57) ABSTRACT

A Current Energy Collection Unit (1) is provided, having a turbine (2) housed within a tubular trapezoid wall (3), forming a densely opaque circular area perpendicular to a natural direction of an upstream water volume flow line (11) capable of causing a variation in the momentum of an upstream water mass (10) absorbing energy from the upstream water mass.

9 Claims, 8 Drawing Sheets

(56) References Cited

U.S. PATENT DOCUMENTS

2009/0047131 A1    2/2009  Neumann
2017/0184069 A1*   6/2017  Roberts .................... F03B 1/02

OTHER PUBLICATIONS

International Preliminary Report on Patentability Under Chapter II for International Application No. PCT/BR2021/050111, dated Apr. 29, 2022, (19 pages), Instituto Nacional Da Propriedade Industrial, Rio de Janeiro, Brazil.

* cited by examiner

CURRENT ENERGY COLLECTION UNIT

CROSS-REFERENCE TO RELATED APPLICATIONS

This application is a national stage of PCT Application No. PCT/BR2021/050111, filed on Mar. 17, 2021, which claims priority to Brazilian Application No. 10 2020 007224.2, filed on Apr. 10, 2020.

INTRODUCTION

The present specification of patent of invention relates to a Current Energy Collection Unit, characterized by comprising a subsea hydraulic turbine connected to emerged or submerged electric generators, a model of Current Electrical Power Plant as a clean, renewable and sustainable energy source.

Furthermore, it should be pointed out the innovative concept of the Current Structure, which recognizes, in the liquid under pressure, some of characteristics of the solid-state matter, and also takes into account the solid percentage in the composition of the sea water.

FIELD OF APPLICATION

The field of application of the Current Energy Collection Unit is the Electricity Sector, in which the Electrical System of the country or of the installation region must absorb the electrical power produced and adds it to those from the existing sources, expanding the offer of power to the commercial distribution; or feeding local and independent electric networks.

END-OF-PURPOSE

The aim of this Current Energy Collection Unit is the capture of the large quantity of kinetic energy associated with extensive blocks of water in the currents of the seas and oceans, and transfer it to electric generators that will transform them into electricity for transmission, distribution and consumption.

PRIOR ART

In the prior art and as is known in the art, it is possible to see on the market models of marine hydraulic turbines that capture and transform the kinetic energy of sea water particles, by unit of time, with mechanical power associated with and proportional to the concept of a Betz Law, since they are based on designs of wind turbines, wherein the combination between quantity, shape and arrangement of the blades allows part of the fluid to flow without interaction through the gaps between the blades, so that the turbines are unable to integrally collect the energy of the flow, as well as when they are unable to collect the large amount of energy associated with the current structures.

TECHNOLOGICAL ADVANCE

Aiming to inaugurate the technique of capturing energy associated with the current structures, which form an abundant energy source available for humanity, the Current Energy Collection Unit (1) was developed, as a device whose technical differences settles down:

In the configuration of the number, shape and arrangement of the blades which, together with the hub and the enclosure structure of the turbine, enclose the projection totally opaque to the flow lines imposing them, in the entirety of the front area, the path deviation guided for the blades, an sine qua non condition for invoking the energy not only from the particles in direct contact with the turbine, but also from all of the particles that constitute the mass of an upstream structure, referred to as the horizontal control volume, characterized by the chemical composition and physical attributes of the sea water, such as pressure, viscosity, compressibility, density and state of matter.

Replacing the concept of effective mechanical power P in the prior art, proportional to the area of coverage of the turbine or of the cross-section at the input of the load compartment A when accompanied by the tubular enclosure accessory, given by:

$$P = \frac{\rho \cdot A \cdot v^3}{2}$$

for:

$$P = \frac{c \cdot \rho \cdot R_e^7 \cdot (R_e^3 - R_x^3) \cdot v^3}{(R_t^3 - R_t \cdot R_x^2)^3}$$

Where the concept of mechanical power is proportional to the product of the torque by the angular velocity of the turbine, determined by the particular dimensions thereof such as the radius of the load compartment ($R_e$), the radius of the turbine ($R_t$) and the radius of the base of the axle ($R_x$); by the speed of the current (v); the density of the water ($\rho$); and the extension of the structure of the current (c).

In the form of an elliptical cap of the hub of the turbine, with a smaller cross-section in the loading compartment and a greater cross-section in the discharge compartment, with consequent acceleration of the particles within the working compartment, while being pushed in the radial direction toward the ends of the blades, resulting in an efficiency gain through the torque gain by speed for the product between the drag forces and the increase in the radius of action;

In the design of the turbine blades whose axial profile is an arc of ellipse, starting in the sense of the current in the load zone, and ending perpendicular to it in the discharge zone, causing a 90° rotation in the sense of the flow, which as a reaction to the Momentum maintenance principle implies the addition of axial forces, favoring the rotation of the turbine.

The traffic in the working compartment in the ordinary direction of the flow is already accelerated as a function of the reduction in the flow section area by the increasing occupation of the turbine volume. However, the speed of the flow in this direction is a component of the absolute speed of the particles because the flow therein travels along the longer path over the ellipse arc of the blades, which is expressed in new acceleration, then axial, promoting even more rotation of the turbine;

The roughness of the surface of the blades when it is intended to increase mechanical efficiency at the expense of longevity, or in the smoothness of the surface of the blades when it is intended to increase longevity at the expense of mechanical efficiency;

In the natural, autonomous alignment of the turbine perpendicular to the flow, rotating freely on its supporting axle attached to the base of installation in the seabed or to the floating platform on the surface. This functionality allows the system to adjust itself to variations in the direction of the current due to tidal oscillations, when that's the case.

DESCRIPTION OF THE DRAWING

To achieve a full and complete visualization of how this Current Energy Collection Unit (1) is built, which is the subject matter of the present invention, as well as the innovative concept of current structures as horizontal control volume, follows the attached non-scale drawings, in which reference is made, as follows:

FIG. 8: Merely conceptual, it highlights the control volume (10) of said Current Energy Collection Unit (1) in an installation condition, that is, it relates to the concept of the structure or water block in the upstream current to which the kinetic energy is associated, and that is renewable by the action of incessant forces of nature at a planetary level, to be converted into electricity before the densely opaque circular area, perpendicular to the natural direction of the flow lines (11), formed by the front perspective of the invention as FIG. 1a.

DESCRIPTION OF THE INVENTION

Figure 1A:
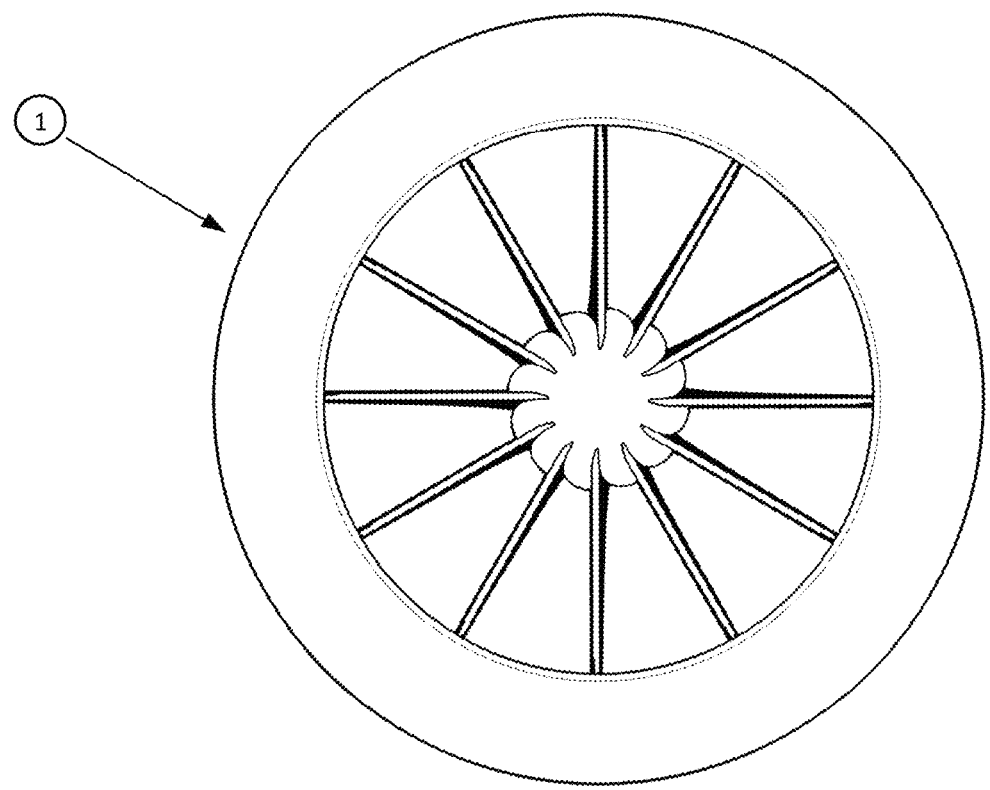
FIG. 1a: It corresponds to the full view of the Current Energy Collection Unit (1) in the operation arrangement, in a frontal view.
Figure 1B:
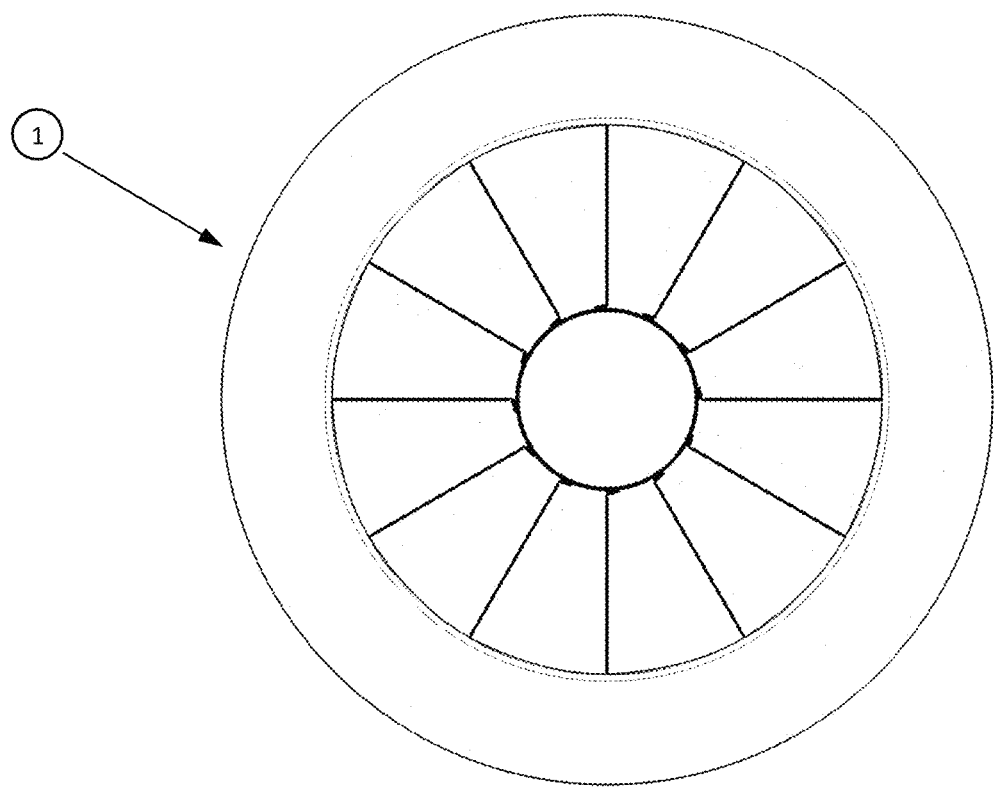
FIG. 1b: It corresponds to the full view of the Current Energy Collection Unit (1) in the operation arrangement, in a rear view.
Figure 1C:
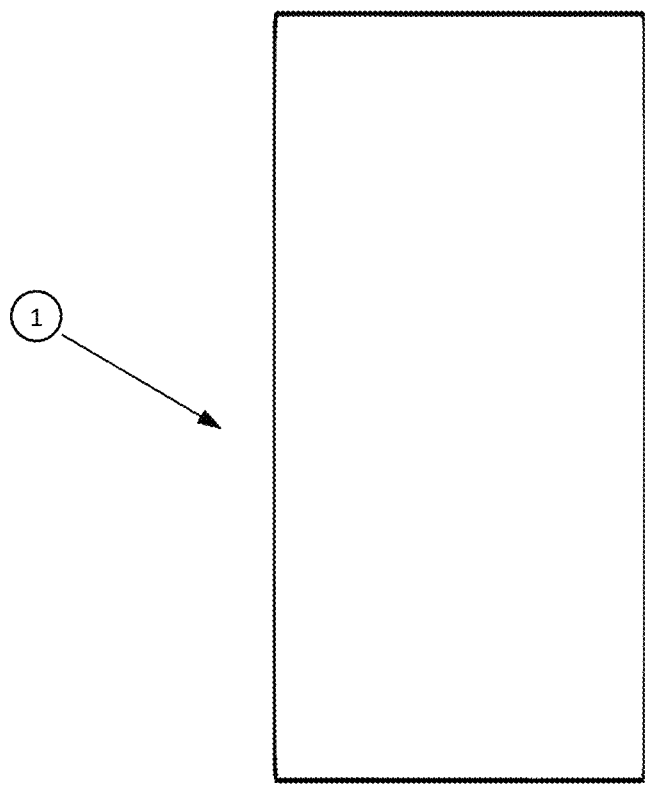
FIG. 1c: It corresponds to the full view of the Current Energy Collection Unit (1) in the operation arrangement, in a side view.
Figure 1D:
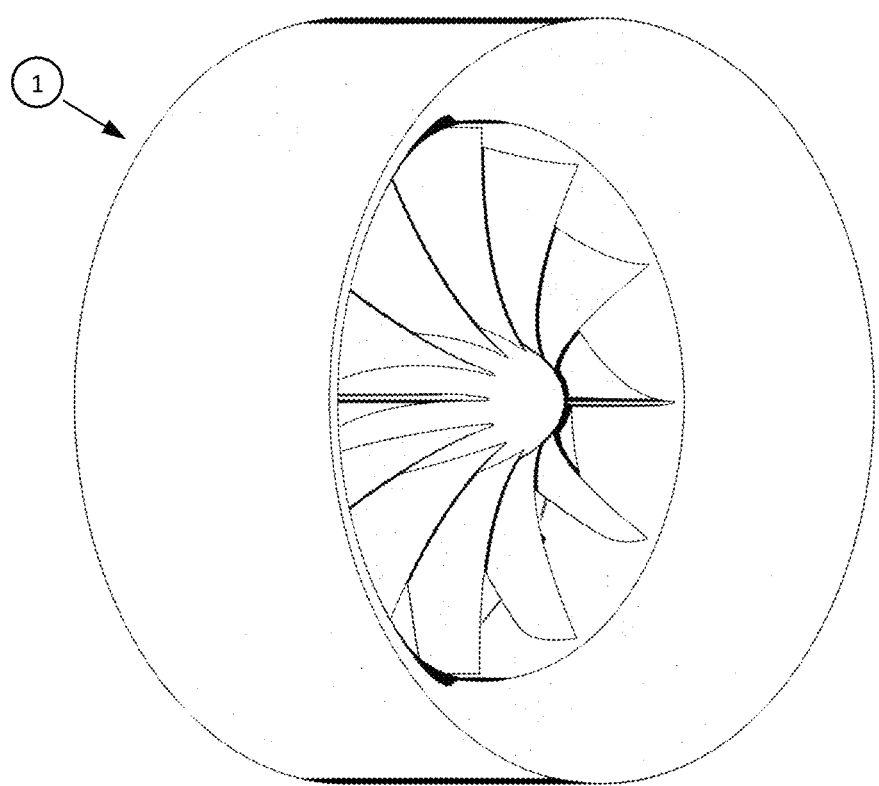
FIG. 1d: It corresponds to the full view of the Current Energy Collection Unit (1) in the operation arrangement, in a perspective.
Figure 2:
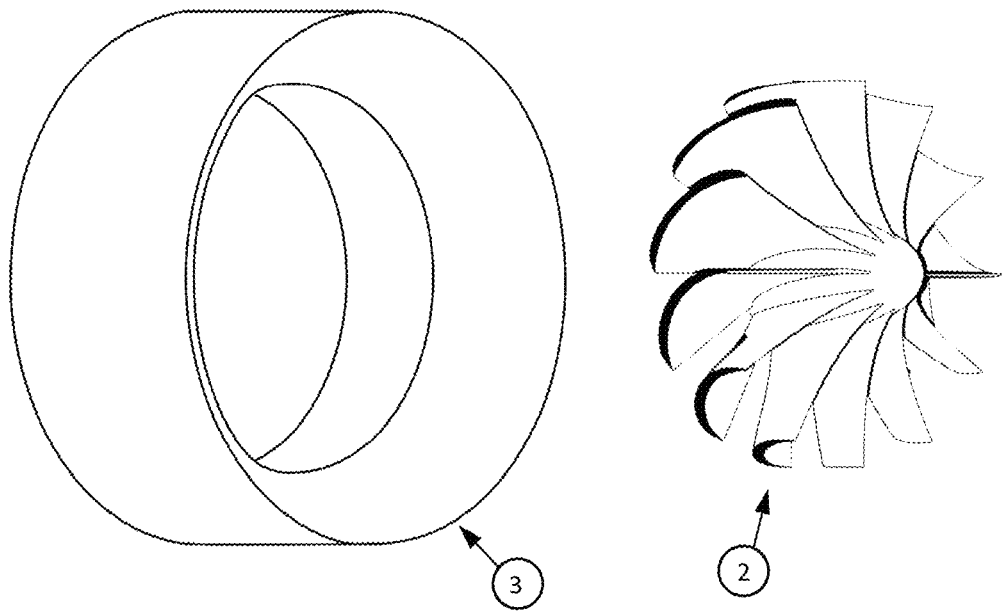
FIG. 2: It relates to the Current Energy Collection Unit (1), highlighting the turbine (2) and its enclosure (3).
Figure 3:
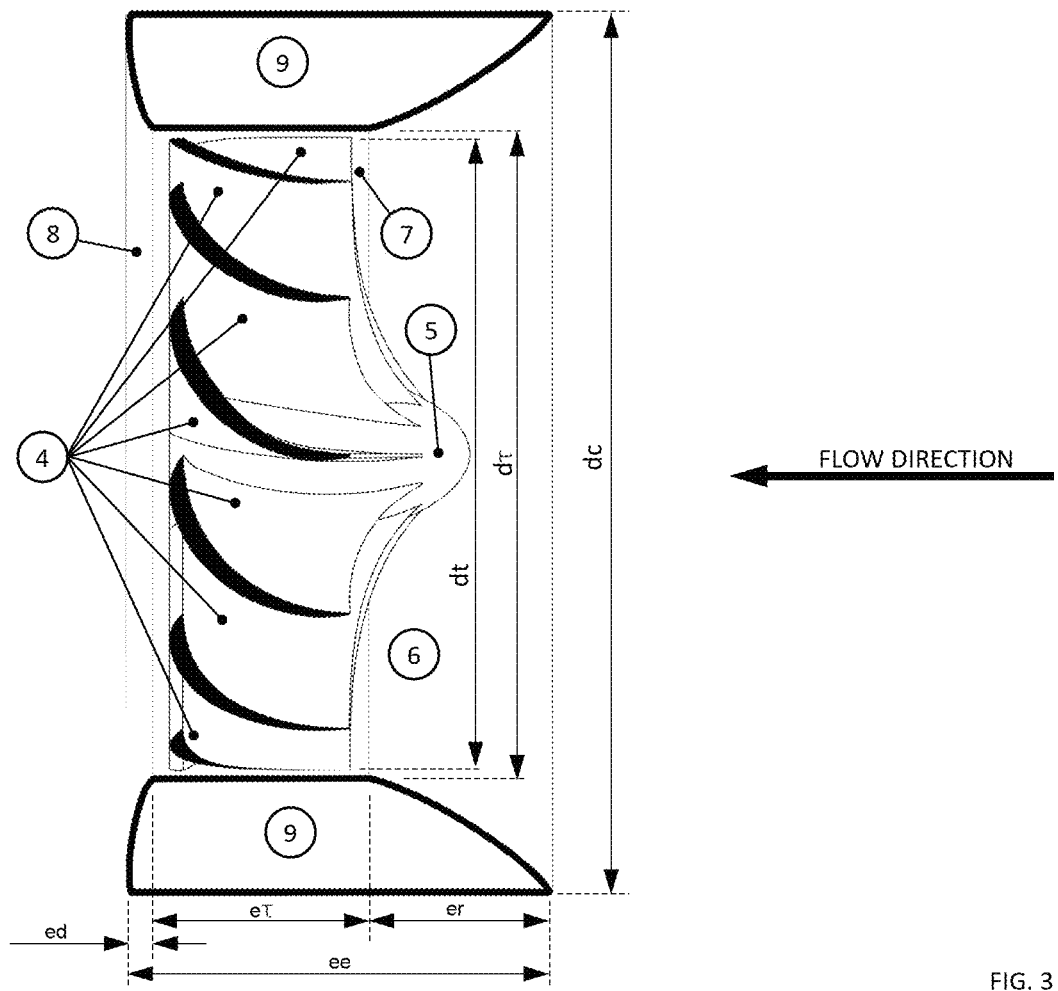
FIG. 3: It illustrates the longitudinal section in relation to the directions of the flow, the enclosure (3), where the component compartments of the horizontal control volume are highlighted, namely: load compartment (6), working compartment (7), and discharge compartment (8); and the free compartment (9) where there is no flow. The working compartment (7) comprises the turbine (2) comprised by blades (4) and a hub (5) in the shape of an elliptical cap.
Figure 4:
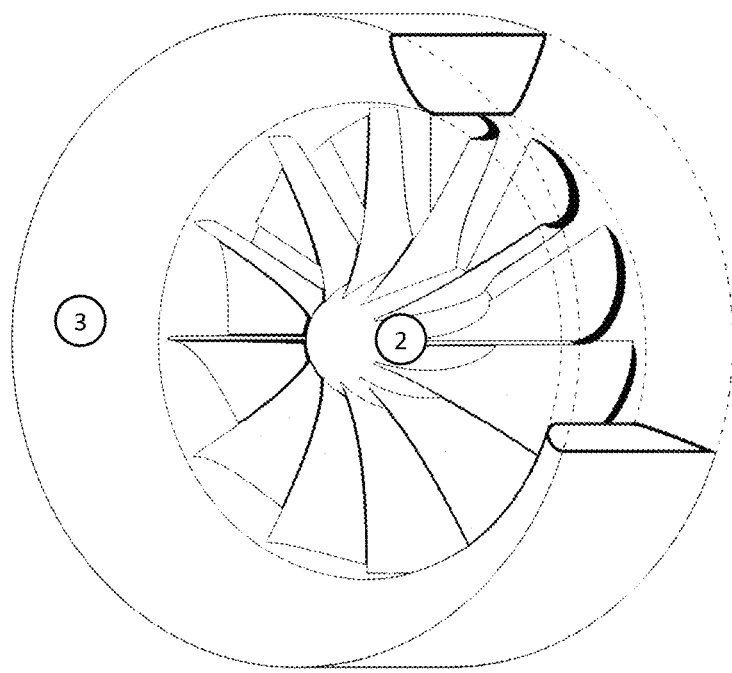
FIG. 4: It shows a perspective of a segment of the enclosure (3) with the complete turbine (2) to be compared with FIG. 5.
Figure 5:
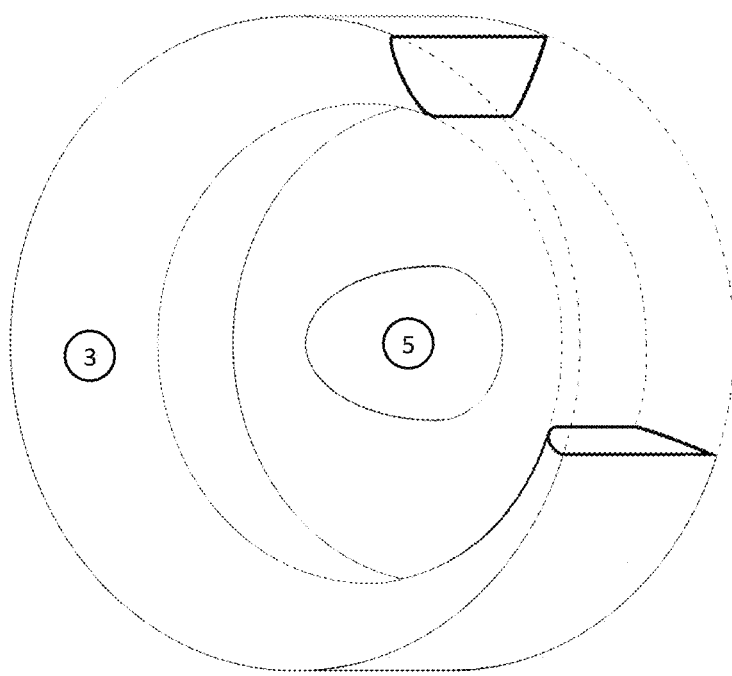
FIG. 5: It shows a perspective of a segment of the enclosure (3) with the part of the turbine corresponding to the hub (5), with the reduction of the cross-sectional area to the current direction.
Figure 6:
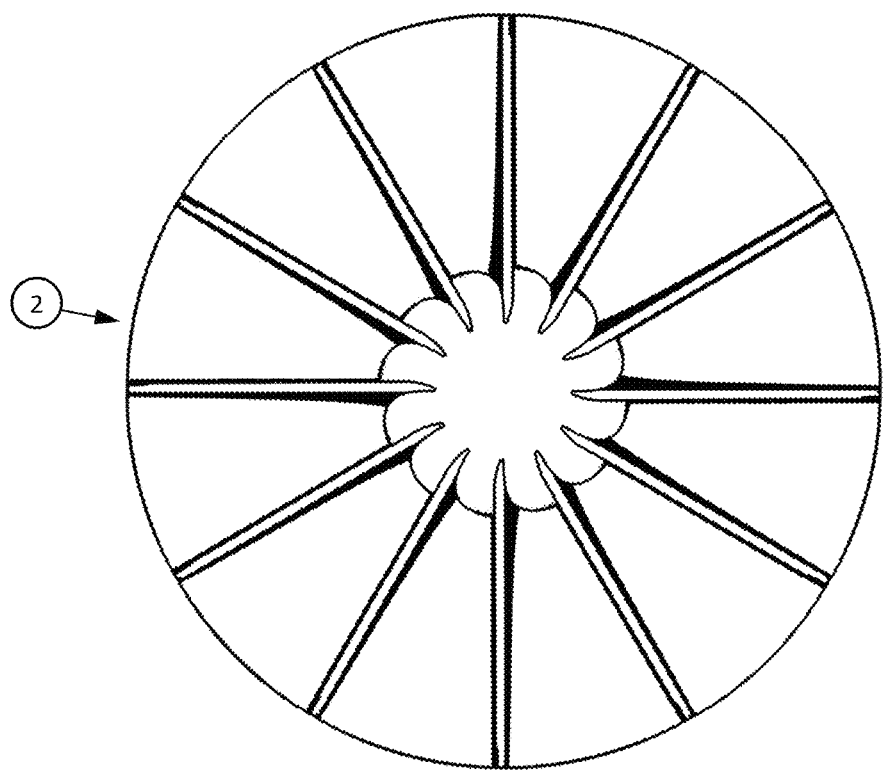
FIG. 6: In an orthogonal front view, it indicates the obstacle area, without any gaps, imposed by the turbine to the flow lines, configured by the number, shape and arrangement of the blades with the hub, i.e., the total opacity through the current, such as a sine qua non condition for capturing the energy associated with the Current Structures.
Figure 7:
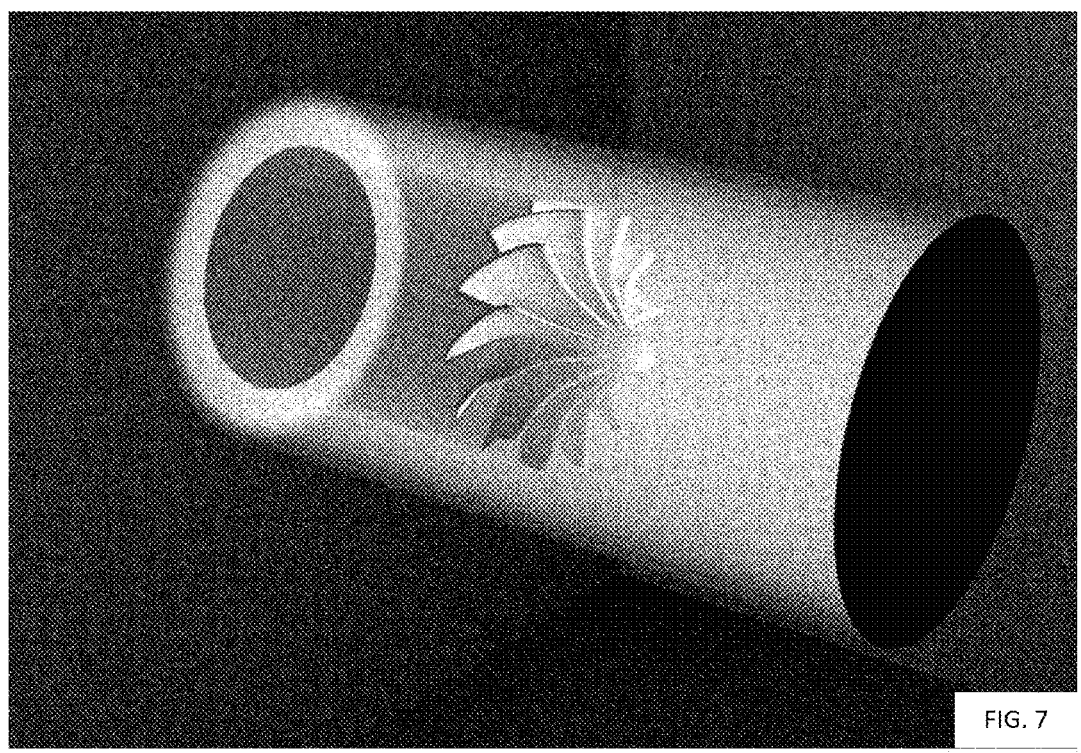
FIG. 7: Illustrates, in perspective, the opacity of the turbine, using the concept of light in parallel beams that are analogous to the flow lines. The volume of the light represents the control volume.
Figure 8:
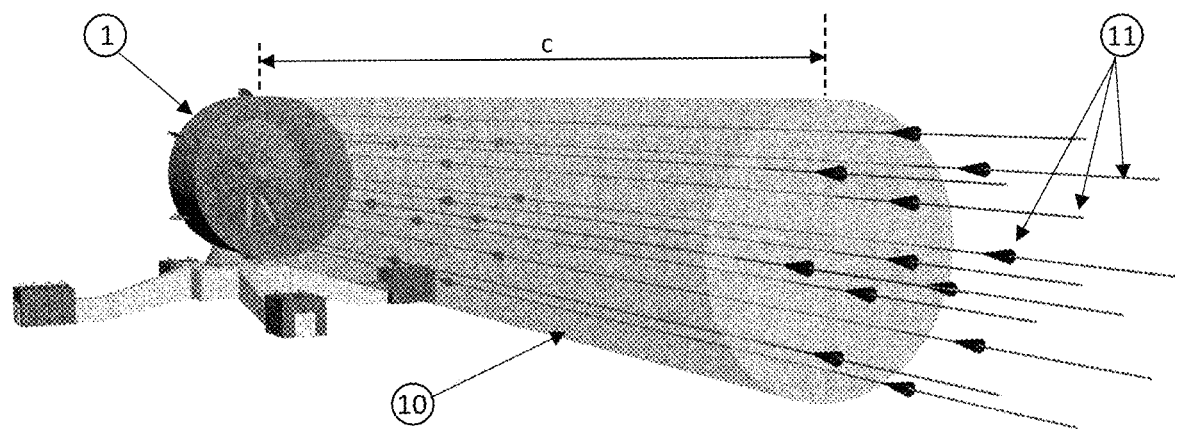

As can be inferred from the accompanying drawings, which are part of this application, the Current Energy Collector Unit is characterized by comprising a reaction turbine (2), positioned in the working compartment (7) of the enclosure structure (3).

Constituted by a hub and blades which project in the entirety of the circular area parallel to the cross-sectional plane to the current, the turbine (2) is a rotary machine which operates submerged, activated by the consequent force of the ratio between the variation in the amount of movement of the upstream current structure (10) and the transit time of the fluid particles through the working compartment, and which transfers the collected mechanical energy in the process to submerged electrical generators or on platforms on the water surface.

The sense of rotation is unique in order to guarantee the maximum efficiency of energy capture, to be defined in the design of each Unit, it must be exclusively clockwise or exclusively anti-clockwise, and it is inefficient to reversibility.

The hub (5), of which is an elliptical cap, has its surface polished, supports the blades (4) while it receives, from each blade, its torque contribution.

Figure 9:
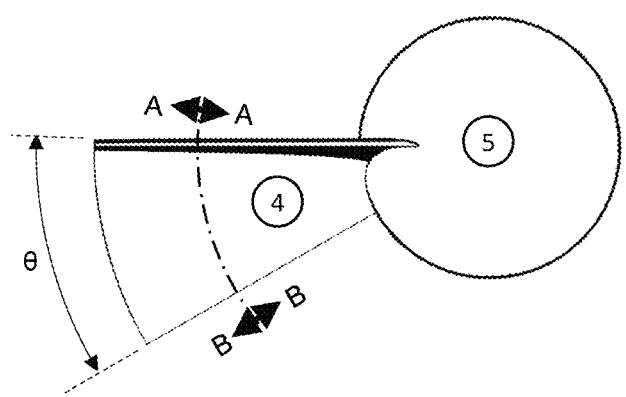
FIG. 9: It shows the frontal view of a single blade (4) with its angle (θ) of coverage thereof, attached to the hub (5), and highlighting on line and point the cutting arc A-B as reference to the scheme shown in FIG. 12.
Figure 10:
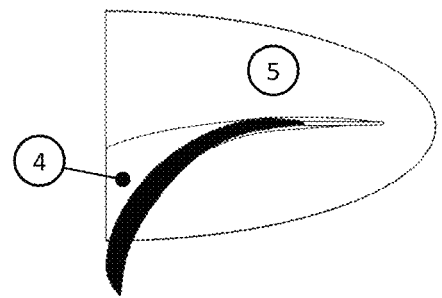
FIG. 10: It highlights, in side view, the profile of a single blade (4) attached to the hub (5).

The blades (4) complete the projection of the entirety of impact area, i.e., the circular area of the turbine with diameter dt parallel to the cross-section plane of the current, wherein the number of blades is the ratio between the circumference and the arch (θ) of each blade (FIG. 9), according to the equation:

$$\theta = \frac{360°}{n}$$

where n is the number of blades and $n \in \mathbb{N}$.

This feature causes each particle of the seawater that is transported in the current to deflect its path to the direction tangential to the hub, urging the reaction of the blade in the opposite sense.

Figure 11:
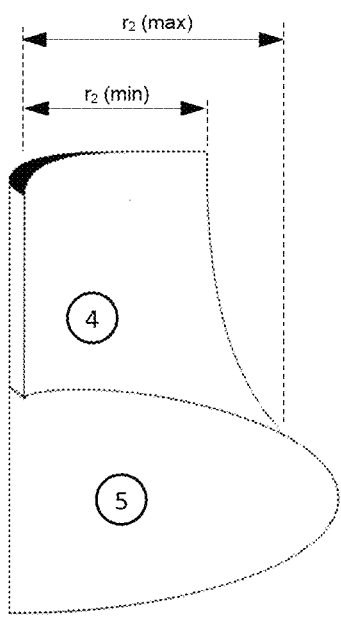
FIG. 11: It highlights, in side view, the surface of a single blade (4), attached to the hub (5).
Figure 12:
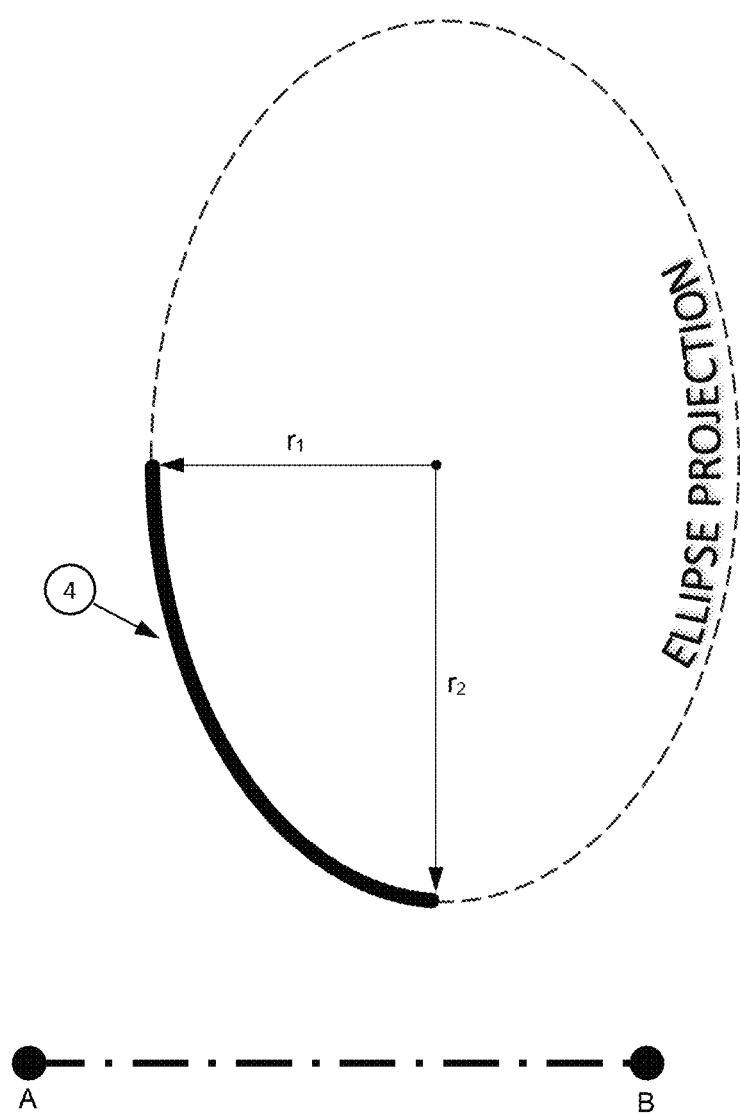
FIG. 12: Plane layout of the axial profile of the blades (4) referenced in FIG. 9 as cutting A-B, whatever the radial position.

The axial profile of the blades is a 90° elliptical arc (FIG. 12). $r_1$ and $r_2$ radius vary in accordance with the radial position, the $r_1$ increasing regularly from the hub to the edge of the turbine. In turn, the $r_2$ radius, on the contrary, decreases from $r_2$ max, on the hub, to $r_2$ min to 50% of the radial line towards the edge of the turbine (FIG. 11), in a curve determined by the mechanical strength of the constituent materials of the individual parts and connections of the turbine.

The blades, such as knifes, have the thickness determined by the mechanical strength of the constituent materials, between internal structure and surface, varying according to the work required.

The turbine has an enclosure as an accessory that, under the scientific branch of mechanics of continuous media, meets the conservation of energy principle, as stated by the Swiss mathematician Daniel Bernoulli. It is a cylindrical tube having a diameter dc and extension ee, wherein the inner side tapers itself with an angle α in the load compartment (6), reducing diameter dc through reduction extension er to the working diameter dτ. The working compartment (7) houses the turbine (2), having the extension eτ. The free compartment (9) is the inner region of the enclosure where there is no flow, it imposes a reduction in the diameter of the loading compartment for the work compartment. The discharge compartment (8) conducts the flow that has already performed the work to the discharge itself, returning it to the current.

The Current Energy Collection Unit is fully scalable:

For meeting the unitary electric power goals or the nominal electric power of standardized generators;

In attention to oceanographic reports pertinent to the installation sites;

In attention to the mechanical strength of the constituent materials.

The dimensions are free, as long as they meet the following rules:

The input diameter of the load compartment (6) is greater than the diameter of the working compartment (7):

dc>dτ.

The reduction extension is a function between the reduction angle and the input diameter of the load compartment (6):

$$er = \frac{(dc - d\tau) \tan \alpha}{2}$$

The diameter of the working compartment (7) is slightly larger than the diameter of the turbine (2), just enough for the turbine to freely rotate without touching the enclosure (3):

dτ>dt

CONCLUSION

The invention relates to an energy collection unit that has been described and illustrated to be a Current Energy Collection Unit, which fits perfectly in the standards governing the patent of invention, and should fill an important gap in the market, deserving, for what has been exposed and as a consequence, the respective privilege.

The invention claimed is:

1. A current energy collector unit comprising:
   an enclosure comprising an outer wall and an inner wall, the inner wall comprising:
     a first inner wall portion that defines a load compartment, and
     a second inner wall portion that is continuous with and downstream of the first inner wall portion and defines a working compartment, wherein:
       the first inner wall portion is inwardly tapered from an upstream end of the inner wall to the second inner wall portion, and
       the second inner wall portion is cylindrical; and
   a turbine, an entirety of which is located in the working compartment defined by the cylindrical second inner wall portion, the turbine comprising:
     a hub, and
     a plurality of blades that extend from the hub and that, when the turbine is viewed in an axial direction from an upstream side, collectively cover an entirety of a circular area defined by outer edges of the blades.

2. The current energy collector unit according to claim 1, wherein:
   the inner wall further comprises a third inner wall portion that is continuous with and downstream of the second inner wall portion and defines a discharge compartment; and
   the third inner wall portion is outwardly tapered from the second inner wall portion to a downstream end of the inner wall.

3. The current energy collector unit according to claim 1, wherein:
   each blade includes an upstream edge that meets the axle, an outer edge continuous with the upstream edge, and a downstream edge that is continuous with the outer edge and meets the axle; and
   the upstream edge of each blade is concave and has a shape of an elliptical arc.

4. The current energy collector unit according to claim 3, wherein:
   an axial length of the outer edge is greater than an axial length of the upstream edge.

5. The current energy collector unit according to claim 3, wherein:
   the downstream edge extends in a plane perpendicular to the axial direction.

6. The current energy collector unit according to claim 1, wherein:
   an upstream portion of the axle has a shape of a portion of an ellipsoid.

7. The current energy collector unit according to claim 1, wherein:
   the outer wall is cylindrical.

8. The current energy collector unit according to claim 1, wherein:
   the outer wall and the inner wall define a free compartment within the envelope structure.

9. The current energy collector unit according to claim 1, wherein:
   the first inner wall has a frustoconical shape.

* * * * *